US012705379B2

(12) United States Patent
Narayanan et al.

(10) Patent No.: US 12,705,379 B2
(45) Date of Patent: Aug. 11, 2026

(54) METHODS AND APPARATUS FOR USING SCAN OPERATIONS TO PROTECT SECURE ASSETS

(71) Applicant: Texas Instruments Incorporated, Dallas, TX (US)

(72) Inventors: Prakash Narayanan, Bangalore (IN); Nikita Naresh, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/354,777

(22) Filed: Jun. 22, 2021

(65) Prior Publication Data

US 2022/0358230 A1 Nov. 10, 2022

(30) Foreign Application Priority Data

May 4, 2021 (IN) ............................ 202141020286

(51) Int. Cl.
*G06F 21/62* (2013.01)
*G06F 15/78* (2006.01)
*G06F 21/74* (2013.01)

(52) U.S. Cl.
CPC .......... *G06F 21/62* (2013.01); *G06F 15/7807* (2013.01); *G06F 21/74* (2013.01)

(58) Field of Classification Search
CPC ............. G06F 21/60–629; G06F 21/74; G06F 15/7807
See application file for complete search history.

(56) References Cited

U.S. PATENT DOCUMENTS 8,438,436 B1 * 5/2013 Baker ............ G01R 31/318588 714/34
10,481,205 B2 * 11/2019 Bhagwat ................. G06F 21/72
10,955,473 B1 * 3/2021 Jain ..................... G01R 31/3177
2003/0204801 A1 * 10/2003 Tkacik ........... G01R 31/318533 714/726
2005/0172184 A1 8/2005 Bancel et al.
(Continued)

FOREIGN PATENT DOCUMENTS

CN 101021885 A 8/2007
WO WO-2018090621 A1 * 5/2018 ......... G01R 31/3185

OTHER PUBLICATIONS

Internation Search Report mailed Aug. 2, 2022, PCT Application No. PCT/US2022/027602, 14 pages.
(Continued)

*Primary Examiner* — Madhuri R Herzog
(74) *Attorney, Agent, or Firm* — Michelle F. Murray; Frank D. Cimino

(57) ABSTRACT

Methods and apparatus are disclosed to protect secure assets using scan operations. One example apparatus includes logic circuitry including a scan chain that includes data storage elements and design logic coupled to the scan chain. The example apparatus also includes data storage to store secure data. The design logic is coupled to the data storage. The example apparatus also includes a security controller to transition the apparatus out of a secure mode of operation. The transition includes the security controller to cause the scan chain to serially shift secure scan data from an input of the scan chain into each data storage element of the data storage elements of the scan chain.

20 Claims, 6 Drawing Sheets

(56) References Cited

U.S. PATENT DOCUMENTS

2009/0037133 A1* 2/2009 Pearson ......... G01R 31/318544 702/120
2010/0023719 A1* 1/2010 Borri ........................ G11C 7/24 711/E12.091
2012/0246528 A1* 9/2012 Pugliesi-Conti ............................. G01R 31/318588 714/E11.155
2013/0132756 A1* 5/2013 Priel ..................... G06F 1/3203 713/324
2016/0020158 A1* 1/2016 Tekumalla ....... G01R 31/31719 716/102
2017/0089978 A1* 3/2017 Hao ................... G01R 31/3177
2019/0033374 A1 1/2019 Bhagwat et al.
2021/0263098 A1* 8/2021 Srivastava ......... G01R 31/3177

OTHER PUBLICATIONS

Written Opinion mailed Aug. 2, 2022, PCT Application No. PCT/US2022/027602, 13 pages.

* cited by examiner

METHODS AND APPARATUS FOR USING SCAN OPERATIONS TO PROTECT SECURE ASSETS

RELATED APPLICATION

This patent claims priority from Indian Patent Application No. 202141020286 filed on May 4, 2021, the entirety of which is incorporated herein by reference.

FIELD OF THE DISCLOSURE

This disclosure relates generally to circuits and, more particularly, to methods and apparatus for using scan operations to protect secure assets.

BACKGROUND

As technology advances, integrated circuit (IC) design complexity continuously increases. As a result, testing ICs for manufacturing and/or design defects has also become increasingly more important and difficult. To facilitate testing an IC for defects after manufacturing, some circuit designers incorporate test circuits (e.g., design-for-test (DFT) circuits, built-in self-test (BIST) circuits, scan chains, etc.) in their circuit designs to facilitate accessing, after the IC is manufactured, various portions of the IC externally (e.g., via external chip pins) or internally (e.g., via built-in test logic, etc.) for testing purposes. For example, a scan chain is a test circuit that is incorporated with other circuit logic (e.g., data communication interface circuitry, etc.) in the IC. The scan chain typically includes a serial chain of data registers that are connected back-to-back in a chain with the output of one data register connected to the input of another data register. The scan chain may be used to shift-in test data into a logic circuit and shift-out test data out of the logic circuit to ensure that every point in the logic circuit is controllable and/or otherwise observable.

Although incorporating test circuits on an IC can facilitate testing the IC, in some scenarios, test circuits can also be used (e.g., by a hacker or a test operator) to obtain and/or modify, in an unauthorized manner, secure data stored on the IC.

DETAILED DESCRIPTION

Figure 1:
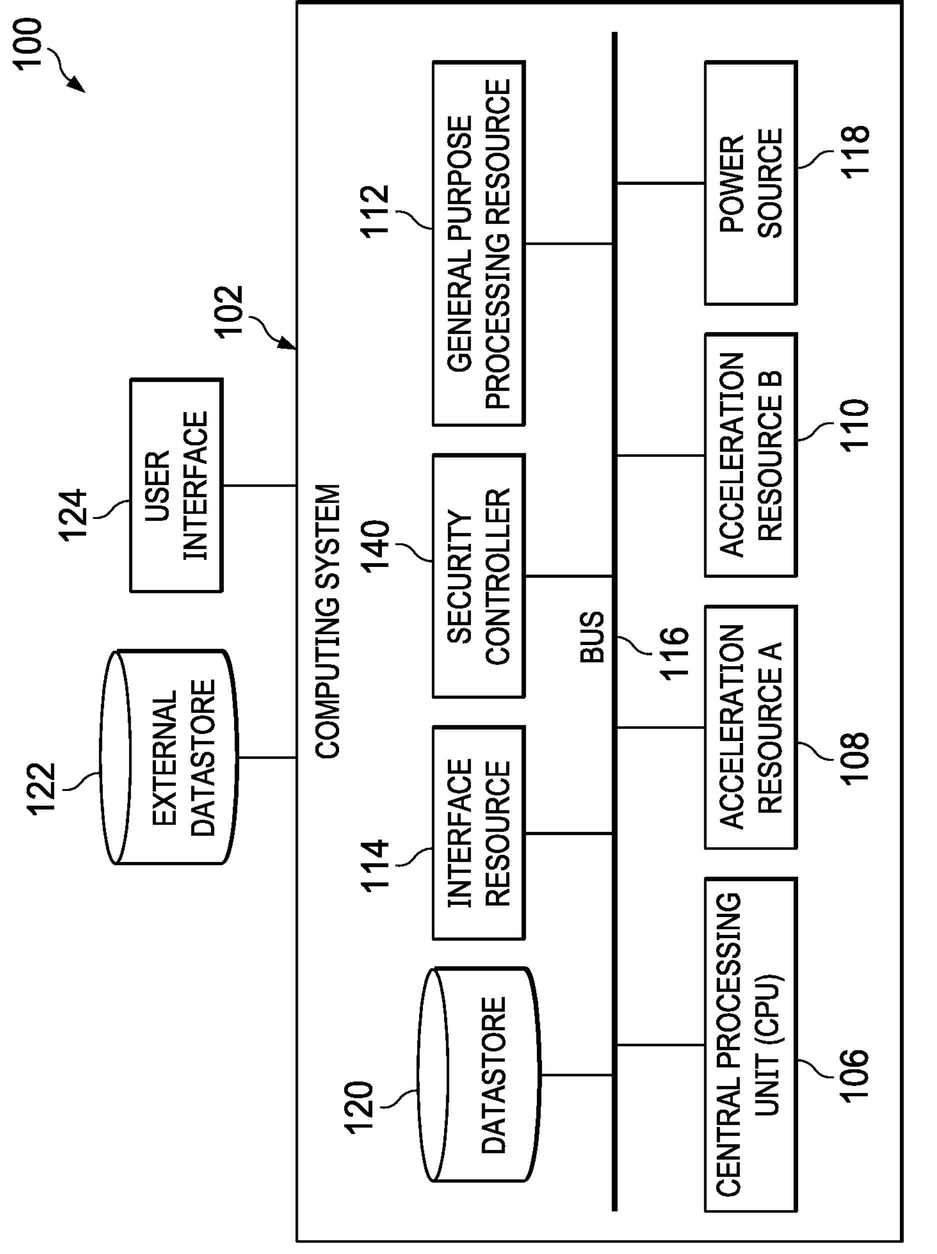
FIG. 1 illustrates an example computing environment including a computing system constructed in accordance with teachings in this disclosure.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "substantially real time" refers to occurrence in a near instantaneous manner recognizing there may be real world delays for computing time, transmission, etc. Thus, unless otherwise specified, "substantially parallel" and "substantially real time" refer to real time +/−1 second.

Some applications utilize system-on-a-chip (SoC) hardware (e.g., one or more ICs packaged in a chip) to carry out computing tasks. A computing system that includes a SoC device may store various types of secure data, such as secure program instructions of an operating system, decrypted user information stored in a volatile memory, encryption keys stored in key registers, etc. When a test scan operation is performed using a test circuit (e.g., scan chain) in the SoC device, some of this secure data may be shifted out of the SoC as part of the output of the test circuit. Further, even if the SoC device resets secure data registers and/or secure memory elements before starting a test scan using the test circuit, some of the secure data may still reside on residual data registers, data pipelines (e.g., buses, memory cache, etc.), and/or other unsecure circuit components, which could be accessed during a later unsecured operation of the SoC device (e.g., during a test scan, etc.).

Examples disclosed herein include methods and apparatus for using scan operations to protect secure assets. One example SoC device described herein includes a security controller, data storage storing secure data, and logic circuitry. The security controller transitions the SoC device into or out of a secure mode. When the security controller transitions the SoC device into the secure mode, the security controller enables access, by the logic circuitry, to the secure data in the data storage. When the security controller transitions the SoC device out of the secure mode, the security controller disables access, by the logic circuitry, to the secure data in the data storage.

The data storage may include any combination of volatile and/or non-volatile memory components (e.g., read-only-memory (ROM), random-access memory (RAM), etc.), a register (e.g., a configuration register), etc., and/or address spaces of hardware and/or memory components that store the secured data.

The logic circuitry of the SoC includes design logic and at least one scan chain. The design logic may correspond to a functional logic unit in the SoC device (e.g., cryptography processor, graphics processor, hardware accelerator, etc.) configured to access the secure data when the SoC device is operating in a secure mode. In some examples, the scan chain includes a plurality of flip-flops (e.g., clocked flip-flops, latches, etc.) that are serially coupled from an input of the scan chain to an output of the scan chain.

Transitioning the SoC device out of the security mode includes securing protection (e.g., by the design logic) to at least a portion of the secure data in the data storage and/or securing protection to other portions of the secured data from the data storage (e.g., secure RAM, secure key registers, etc.). Further, as part of the transition out of the secure mode, the security controller causes the scan chain (and/or a plurality of scan chains in the SoC device) to serially shift secure scan data from the input of the scan chain to the output of the scan chain. The security controller also intercepts and/or diverts the output of the scan chain(s) until the transition out of the secure mode is complete. More generally, through this process, the security controller flushes the flip-flops in the scan chain(s) and/or within the design logic stimulated and/or measured by the scan chain(s) before exiting the secure mode so that unsecure SoC processes (e.g., shift scan operations, scan chain test operations, etc.) do not intentionally and/or unintentionally compromise the secure data.

FIG. 1 is an illustration of an example computing environment 100 including an example computing system 102 constructed in accordance with teachings in this disclosure. The computing system 102 includes an example central processing unit (CPU) 106, a first example acceleration resource (ACCELERATION RESOURCE A) 108, a second example acceleration resource (ACCELERATION RESOURCE B) 110, an example general purpose processing resource 112, an example interface resource 114, an example bus 116, an example power source 118, an example datastore 120, and an example security controller 140. Further depicted in the illustrated example of FIG. 1 is an example user interface 124 and an example external datastore 122.

In some examples, the computing system 102 is a system-on-a-chip (SoC) device representative of one or more integrated circuits (ICs) (e.g., compact ICs) that incorporate components of a computer or other electronic system in a compact format. For example, the computing system 102 may be implemented with a combination of one or more programmable processors, hardware logic, and/or hardware peripherals and/or interfaces. Additionally or alternatively, the example computing system 102 of FIG. 1 may include memory, input/output (I/O) port(s), and/or secondary storage. In some examples, the computing system 102 includes any combination of the CPU 106, the first acceleration resource 108, the second acceleration resource 110, the general purpose processing resource 112, the interface resource 114, the bus 116, the power source 118, the datastore 120, the memory, the I/O port(s), and/or the secondary storage integrated on a single IC substrate. Additionally or alternatively, in some examples, one or more components of the example computing system 102 illustrated in FIG. 1 (e.g., the example power source 118) are implemented outside the example computing system 102 and are connected to the example computing system 102 similarly to the example user interface 124. In some examples, the computing system 102 includes digital, analog, mixed-signal, radio frequency (RF), or other signal processing functions.

In some examples, the computing system 102 implements an electronic control unit (ECU) in a vehicle (e.g., a driver operated vehicle, an autonomous vehicle, etc.). For example, the computing system 102 may be an ECU that controls one or more components, functions, etc., of a vehicle. In some examples, the computing system 102 may be an ECU that controls an engine (e.g., a combustion engine), a motor (e.g., an electric motor), a transmission, an infotainment system, a light detection and ranging (LIDAR) system, etc., and/or a combination thereof.

The CPU 106 is a multi-core CPU. For example, the CPU 106 includes a plurality of cores (e.g., compute cores, processor cores, etc.) that may execute instructions, application code, etc. To that end, in some examples, the CPU 106 includes one or more processors that execute machine readable instructions. The first acceleration resource 108 is a graphics processing unit (GPU). For example, the first acceleration resource 108 may be a GPU that generates computer graphics, executes general-purpose computing, etc. In some examples, the first acceleration resource 108 may generates graphics for the user interface 124 and the second acceleration resource 110 is an AI accelerator. For example, the second acceleration resource 110 may be a vision processing unit to effectuate machine or computer vision computing tasks, object-identification computing tasks, etc.

The general purpose processing resource 112 is a programmable processor. For example, the general purpose processing resource 112 may be a CPU, a GPU, etc. Alternatively, one or more of the first acceleration resource 108, the second acceleration resource 110, and/or the general purpose processing resource 112 may be a different type of hardware such as a digital signal processor (DSP), an application specific integrated circuit (ASIC), a programmable logic device (PLD), and/or a field programmable logic device (FPLD) (e.g., a field-programmable gate array (FPGA)).

The interface resource 114 is hardware that implements and/or is representative of one or more interfaces (e.g., computing interfaces, network interfaces, vehicle network or bus interfaces, industrial protocol network or bus interfaces, etc.). For example, the interface resource 114 may be hardware, software, and/or firmware that implements a communication device (e.g., a communication gateway, a network interface card (NIC), a smart NIC, etc.) such as a transmitter, a receiver, a transceiver, a modem, an industrial protocol gateway, a residential gateway, a wireless access point, and/or a network interface to facilitate exchange of data with external machines (e.g., computing devices of any kind) via the network 126. In some examples, the communication is effectuated via a Bluetooth® connection, a controller area network (CAN) bus, an Ethernet connection, a digital subscriber line (DSL) connection, a wireless fidelity (Wi-Fi) connection, a telephone line connection, a coaxial cable system, a satellite system, a line-of-site wireless system, a cellular telephone system, etc. For example, the interface resource 114 may be implemented by any type of interface standard, such as a Bluetooth® interface, a CAN interface, an Ethernet interface, a Wi-Fi interface, a universal serial bus (USB), a near field communication (NFC) interface, and/or a PCI express interface.

The bus 116 corresponds to, is representative of, and/or otherwise includes at least one of a CAN bus, an Inter-Integrated Circuit (I2C) bus, a Serial Peripheral Interface (SPI) bus, a Peripheral Component Interconnect (PCI) bus, a JTAG interface, a data cache, an instruction cache, and/or any other type of data pipeline. Additionally or alternatively, the bus 116 may implement any other type of computing or electrical bus.

In the illustrated example of FIG. 1, the computing system 102 includes the power source 118 to deliver power to resource(s) of the computing system 102. In this example, the power source 118 is implemented by one or more batteries (e.g., lithium-ion batteries or any other chargeable battery or power source). For example, the power source 118 may be chargeable using a power adapter or converter (e.g., an AC/DC power converter), a wall outlet (e.g., a 110 V AC wall outlet, a 220 V AC wall outlet, etc.), etc. In some examples, the power source 118 may be chargeable by a vehicle component such as an alternator. Alternatively, in other examples, the power source 118 is implemented outside the computing system 102 as an external component coupled the computing system 102.

The computing system 102 includes the datastore 120 to store data, including program instructions, secure data, public data, etc. The datastore 120 may be implemented by a volatile memory (e.g., one or more flip-flops, Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 120 may additionally or alternatively be implemented by one or more double data rate (DDR) memories, such as DDR, DDR2, DDR3, DDR4, mobile DDR (mDDR), etc. The datastore 120 may additionally or alternatively be implemented by one or more mass storage devices such as hard disk drive(s) (HDD(s)), compact disk (CD) drive(s), digital versatile disk (DVD) drive(s), solid-state disk drive(s), etc. While in the illustrated example the datastore 120 is illustrated as a single datastore, the datastore 120 may alternatively or additionally be implemented by any number and/or type(s) of datastores. Furthermore, the data stored in the datastore 120 may be in any data format such as, for example, binary data, comma delimited data, tab delimited data, structured query language (SQL) structures, etc.

The computing system 102 is in communication with the external datastore 122. For example, the external datastore may be implemented by a non-volatile memory (e.g., flash memory) and/or a volatile memory (e.g., SDRAM, etc.) communicatively coupled to the computing system 102. The external datastore 122 may additionally or alternatively be implemented by one or more mass storage devices such as hard disk drive(s) (HDD(s)), compact disk (CD) drive(s), digital versatile disk (DVD) drive(s), solid-state disk drive(s), etc. While in the illustrated example the external datastore 122 is illustrated as a single datastore, the external datastore 122 may alternatively or additionally be implemented by any number and/or type(s) of datastores. Furthermore, the data stored in the external datastore 122 may be in any data format such as, for example, binary data, comma delimited data, tab delimited data, structured query language (SQL) structures, etc.

The computing system 102 is in communication with the user interface 124. For example, the user interface 124 may be implemented by a graphical user interface (GUI), an application display, etc., which may be presented to a user on one or more display devices in circuit with and/or otherwise in communication with the computing system 102. In such examples, a user (e.g., a customer, a developer, a vehicle maintenance technician, a vehicle driver, a vehicle passenger, etc.) controls the computing system 102 via the user interface 124. Alternatively, the computing system 102 may include and/or otherwise implement the user interface 124.

The computing system 102 includes the security controller 140 to transition the computing system 102 into or out of a secure mode. For example, the security controller 140 transitions the computing system 102 into the secure mode by enabling access to secure data storage elements (e.g., memory addresses in the datastore 120, the CPU 106, the general purpose processing resource 112, etc., where secure data is stored) for one or more trusted components (e.g., logic circuitry, etc.) in the computing system 102. Additionally, for example, the security controller 140 transitions the computing system 102 out of the secure mode by securing protection to the secure data storage elements, and/or by performing other operations to improve the protection of the secure data (e.g., clearing residual portions of the secure data that may be present in the bus 116 and/or other circuitry in the computing system 102). In some examples, the security controller 140 may be implemented by a hardware state machine and/or by a processor and machine readable instructions that, when executed by the processor, perform the functions of the security controller.

One or more of the CPU 106, the first acceleration resource 108, the second acceleration resource 110, the general purpose processing resource 112, the interface resource 114, the power source 118, the datastore 120, and the security controller 140 are in communication with the bus 116.

Figure 2:
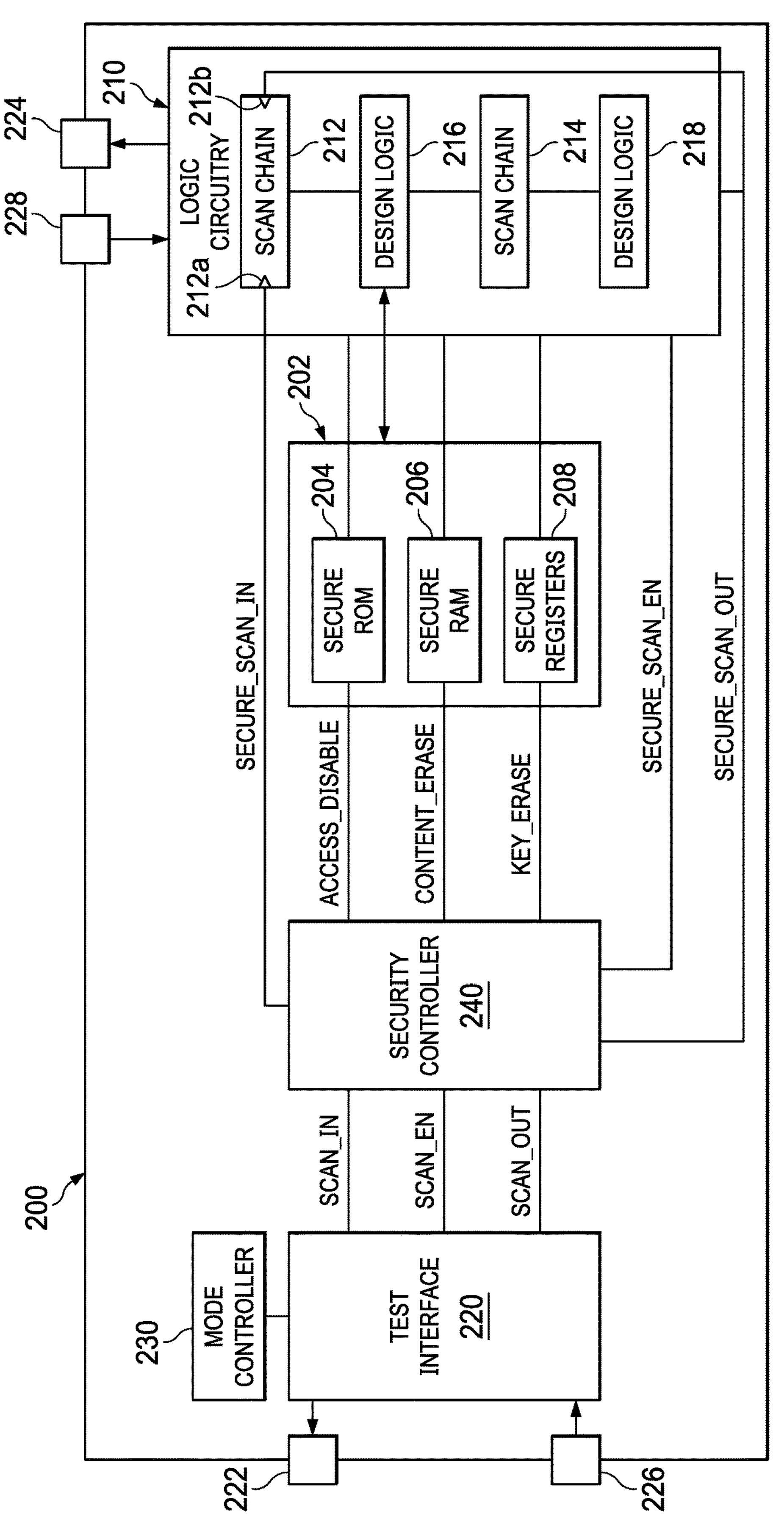
FIG. 2 is a block diagram of an example system-on-a-chip (SoC) device that implements a portion of the example computing system of FIG. 1 that includes an example security controller.

FIG. 2 is a block diagram of an example SoC device 200 that implements a portion of the example computing system 102 including the example security controller 140 of FIG. 1. In some examples, the SoC device 200 is implemented by hardware, software, firmware and/or a combination thereof. In some examples, the SoC device 200 may implement any combination of one or more components in the computing system 102, the CPU 106, the acceleration resources 108, 110, the general purpose processing resource 112, the interface resource 114, the bus 116, the power source 118, and/or the datastore 120 of FIG. 1. In some examples, the SoC device 200 is an IC device in which all the components of the example SoC device 200 illustrated in FIG. 2 are integrated on a single IC substrate. Alternatively, in other examples, the SoC device 200 is instead implemented by multiple electrically coupled ICs, such that one or more of the components of the SoC device 200 illustrated in FIG. 2 are integrated on a first IC substrate, one or more other illustrated components of the SoC device 200 are integrated on a second IC substrate, and so on.

In the illustrated example of FIG. 2, the example SoC device 200 includes example secure data storage 202, example logic circuitry 210, an example test interface 220, example output ports 222, 224, example input ports 226, 228, an example mode controller 230, and an example security controller 240. In some examples, one or more of the example secure data storage 202, the example logic circuitry 210, the example test interface 220, the example output ports 222, 224, the example input ports 226, 228, the example mode controller 230, and/or the example security controller 240 are integrated on an IC substrate.

In the illustrated example of FIG. 2, the example secure data storage 202 includes an example secure read-onlymemory (ROM) 204, an example secure random access memory (RAM) 206, and example secure registers 208. Although the secure data storage 202 is illustrated as a single block in FIG. 2, in some examples, the example secure data storage 202 is physically implemented as one or more data storage elements in one or more volatile and/or non-volatile physical memory devices (e.g., flip-flops, data registers, memory space addresses inside a ROM or RAM, etc.). In general, the example secure data storage 202 includes any combination of volatile and/or non-volatile data storage elements (e.g., flip-flops, data registers, RAM, DRAM, SDRAM, Read-Only-Memory (ROM), etc.) that store secure data. The term 'secure data' is used herein to describe any type of information for which the SoC device 200 is configured to limit access to prevent unauthorized entities and/or applications from viewing and/or manipulating the secure data. For example, the secure data may include program instructions (e.g., stored in the secure ROM 204) used to operate an operating system or other critical application of the computing system 102, decrypted data (e.g., decrypted by a cryptography processor of the computing system 102) stored in the secure RAM 206, encryption keys (e.g., customer keys, manufacturer keys, etc.) stored in the secure registers 208, etc.

The secure ROM 204 stores secure data such as machine readable instructions (e.g., executable by one or more processors), such as firmware, system boot code, etc., and/or stores other secure information (e.g., manufacturer code, activation keys, etc. In some examples, the SoC device 200 allows access to the secure data in the secure ROM 204 to one or more trusted entities (e.g., systems, applications, etc.) only when the SoC device 200 is operating in a secure mode. The secure RAM 206 includes secure data that is stored into the secure RAM 206 (e.g., by one or more components of the logic circuitry 210) during operation of the SoC device 200 in the secure mode. For example, the secure RAM 206 may include a secure stack data, secure global data, secure heap data, etc. In some examples, the secure RAM 206 includes secure program code (e.g., machine readable instructions) that is transferred into the secure RAM 206 (e.g., from the external datastore 122 of FIG. 1, etc.) by a trusted entity (e.g., cryptography logic, operating system, etc.) while the SoC device 200 is operating in the secure mode. The secure registers 208 include one or more data storage circuit elements (e.g., data registers, flip-flops, etc.) that store confidential information such as encryption keys (e.g., Advanced Encryption Standard (AES) keys, manufacturer keys, customer keys, hardware keys, etc.).

The example logic circuitry 210 includes any combination of hardware circuitry (e.g., logic gates, data registers, data buses, instruction buses, analog circuit components, processors, memories, etc.) that are electrically coupled to perform logical functions described by a circuit design. In the illustrated example of FIG. 2, the example logic circuitry 210 includes example scan chains 212 and 214, and example design logic 216 and 218. In some examples, the scan chains 212 and 214 may implement secure scan chains as described below. In some examples, the scan chain 212 may implement a secure scan chain and the scan chain 214 may not implement a secure scan chain. In some examples, the scan chain 212 may not implement a secure scan chain and the scan chain 214 may implement a secure scan chain.

The example scan chain 212 includes a plurality of data storage elements (e.g., latches, flip-flops, etc.) that are serially coupled to shift a data bit (logic '1' or logic '0') from an input 212*a* of the example scan chain 212 to an output 212*b* of the example scan chain 212. Similarly, the example scan chain 214 includes a plurality of serially coupled data storage elements. In some examples, example scan chains 212 and/or 214 is/are coupled to the example design logic 216 and/or 218. By way of example, an input of a first flip-flop (not shown) of scan chain 212 can be connected to an output of a data register (not shown) inside the example design logic 216, and/or an output of a second flip-flop (not shown) of scan chain 212 can be connected to an input of a logic gate (not shown) inside the example design logic 218, and so on. In this way, during a scan operation, the scan chain 212 and/or 214 can be used to stimulate (e.g., by injecting a logical value at an input, etc.) the example design logic 216 and/or 218, and/or can be used to measure logical values at various nodes (e.g., inputs/outputs of various circuit components) inside the design logic 216 and/or 218. For example, a test pattern (e.g., sequence of logic data bits) can be serially shifted into the scan chain 212 at the input 212*a* to test the behavior of the design logic 216 in response to receiving that test pattern at a certain node inside the design logic 216. Additionally or alternatively, for example, the logical states (e.g., logic '1', logic '0') at a given node inside the design logic 216 can be analyzed based on an output stream of data bits that are serially shifted out of the scan chain 212 at the output 212*b*.

Each of the example design logic 216 and 218 includes a group of circuit components (e.g., flip-flops inside processor circuitry, memory devices, instruction/data bus registers, flip-flops, latches, other types of temporary or residual data storage components, logic gates, analog circuitry, etc.) that are wired to perform respective logical functions (e.g., a synchronizer that receives an input signal synchronized to a first clock domain and outputs an output signal synchronized to a second clock, a data communication interface that receives an input data stream and outputs an output data stream formatted according to a specific data communication protocol, etc.) in accordance with various circuit design applications implemented using the example SoC device 200. In general, various example logical functions and/or processes can be implemented using the example design logic 216 and/or 218, including processes that involve using (e.g., storing and/or retrieving) the secure data in the secure data storage 202 and/or processes that do not use the secured data. Further, the example design logic 218 may perform a different logical function than that of the design logic 216.

In some examples, the scan chain 212 (and/or 214) is at least partially included within the example design logic 216 (and/or 218). By way of example, the scan chain 212 may include a flip-flop that is used to delay a signal from entering a register of the design logic 216 when the SoC device 200 is operating in a functional or normal mode, and the same flip-flop can also be used to serially shift a data bit into a subsequent flip-flop in the scan chain 212 when the SoC device 200 is operating in a test mode or other scan mode. Alternatively, in some examples, the scan chain 212 (and/or 214) can be implemented as a logically separate circuit portion of the SoC device 200 that is connected to inputs (and/or outputs) of one or more components inside the design logic 216 (and/or 218).

Although the illustrated example of FIG. 2 shows two scan chains 212, 214, and two design logic 216, 218, in alternative examples, the example logic circuitry 210 may include fewer or more scan chains and/or fewer or more design logic units. Further, although the illustrated example of FIG. 2 shows the design logic 216 connected to two scan chains 212, 214 and the design logic 218 connected to one scan chain 214, in alternative examples, the design chain 216 (and/or 218) can be coupled to fewer or more scan chains.

The example test interface 220 communicates data into and/or out of the example SoC device 200 (e.g., via the example input port 226 and the example output port 222). For example, when the SoC device 200 is operating in a test mode, the example test interface 220 may receive a test pattern from an external system (e.g., automated test equipment (ATE) system, etc.) at input port 226, and transmit the test pattern (or an indication thereof) for receipt at the input 212*a* of the scan chain 212 (and/or at an input of the scan chain 214, etc.). Additionally or alternatively, when the SoC device 200 is operating in the test mode, the test interface 220 may communicate an indication of an output 212*b* of the scan chain 212 (and/or an output of the scan chain 214) out of the SoC device 200 through the example output port 222. In some examples, the test interface 220 also modulates a scan enable input of the scan chain 212 (and/or 214) to configure the scan chain 212 (and/or 214) in a scan mode where the scan chains 212 and/or 214 serially shift data in line with the discussion above.

The example ports 222, 224, 226, 228 (i.e., the input ports 226, 228 and the output ports 222, 224) are physical structures that can be used to electrically couple the SoC device 200 with another device or system, such as, for example the example external datastore 122 of FIG. 1, the example user interface 124 of FIG. 1, another component or resource of the example computing system 102 of FIG. 1, an external computing system such as a test platform, a communication interface such as an antenna, and/or any other device or system. More generally, the example ports 222, 224, 226, 228 may be implemented by one or more terminals of the SoC device 200. In some examples, the one or more terminals (i.e., the example ports 222, 224, 226, 228, etc.) of the SoC device 200 may be constructed with and/or otherwise be composed of aluminum, copper, etc., or any other conductive material or combination thereof. In some examples, the one or more terminals (i.e., the example ports 222, 224, 226, 228, etc.) of the SoC device 200 may be implemented as pins (e.g., integrated circuit pins). Alternatively, the one or more terminals (i.e., the example ports 222, 224, 226, 228, etc.) of the SoC device 200 may be implemented as legs (e.g., conductive legs), lugs (e.g., conductive lugs), or any other type of electrical contact.

The example mode controller 230 provides (e.g., to the test interface 220 and/or the security controller 240) a mode signal to request transition of an operation mode of the SoC device 200 into one of a plurality of operation modes. A first example operation mode is a functional mode in which the example SoC device 200 authorizes the example logic circuitry 210 to operate without accessing the secure data storage 202. A second example operation mode is a test mode in which the example scan chain 212 (and/or 214) perform a scan operation using an input scan test pattern (e.g., received by the example test interface 220 via the example input port 226 and transferred to the input 212*a*, etc.), and in which the test interface is to transmit (e.g., via the example output port 222) an output signal indicative of the serially shifted data from the output 212*b* of the scan chain 212. A third example operation mode is a secure mode in which the example SoC device 200 disables (and/or removes) secure data from the secure data storage 202 and/or other data storage elements (e.g., residual registers, scan chain 212, 214, design logic 216, 218, etc.) in the logic circuitry 210. Various other operation modes are possible depending on various applications of the example SoC device 200.

In some examples, the example mode controller 230 asserts a test mode signal into the test interface 220 (and/or the security controller 240) to request transition of the operation mode of the SoC device 200 into the test mode. In response, the test interface 220 (and/or the security controller 240) could perform a sequence of operations (e.g., to setup ports 222, 226, etc.) and/or determines whether to trigger the transition of the operation mode into the test mode or reject the request for entering the test mode. In some examples, the example mode controller 230 de-asserts the test mode signal and/or otherwise signals to the test interface 220 and/or the security controller 240 a request for transitioning the operation mode of the SoC device 200 out of the test mode (e.g., into the functional mode, etc.).

Additionally or alternatively, in some examples, the example mode controller 230 asserts a secure mode signal (and/or otherwise requests entry into a secure mode) into the example security controller 240 (and/or the example test interface 220) to request transition of the operation mode of the SoC device 200 into the secure mode. In response, the example security controller 240 performs a sequence of operations (e.g., a secure mode exit sequence, a secure data reset or initialization sequence, etc.) to transition the operation mode of the example SoC device 200 into the secure mode and/or to determine whether the request for entering the secure mode should be rejected. In some examples, the example mode controller 230 de-asserts the secure mode signal and/or otherwise signals to the security controller 240 a request for transitioning the operation mode of the SoC device 200 out of the secure mode (e.g., into the functional mode or the test mode, etc.).

The example security controller 240 is similar to the example security controller 140 of FIG. 1. For example, the example security controller 240 controls access (by the logic circuitry 210) to the secure data storage 202, transitions the operation mode of the SoC device 200 into or out of the secure mode, and/or performs other operations related to protecting secure data in the SoC device 200 from unauthorized (or unintended) access or manipulation.

As noted above, in some examples, the example security controller 240 transitions the SoC device 200 into the secure mode. As part of the transition process, the example security controller 240 may perform a security mode entry sequence of operations that include enabling access to the example secure ROM 204 for one or more trusted entities (e.g., design logic for booting the SoC device 200, etc.). To enable access to the secure ROM 204, for instance, the example security controller 240 may de-assert (i.e., set to a logic '0' state) an access disable input of the secure ROM 204, assert (e.g., set to a logic '1' state) an access enable input (not shown in FIG. 2) of the secure ROM 204, or otherwise instruct the secure ROM 204 to enable access to the secure data stored therein. Additionally, in some examples, the example security controller 240 similarly enables access to the secure RAM 206 and/or the secure registers 208 as part of the secure mode entry sequence. In some examples, as part of the transition process into the secure mode, the example security controller 240 loads (and/or instructs one or more components of the logic circuitry 210 to load) secure data into the secure RAM 206 and/or the secure registers 208. For example, the example security controller may load encryption keys into the secure register 208 and/or machine readable instructions (for execution by the design logic 216 and/or 218) into the secure RAM 206.

In some examples, the example security controller 240 transitions the SoC device 200 out of the secure mode. As part of the transition out of the secure mode, the example security controller 240 may perform a security mode exit sequence of operations to secure protection of secured data stored by storage hardware. In some examples, secure data used by the design logic 216 (and/or 218) may remain in the logic circuitry 210 (e.g., in residual data registers, data pipelines, data buses, flip-flops, scan chain flip-flops, processor flops, etc.) even if the security controller asserts the reset inputs of resettable data storage elements in the logic circuitry 210. By way of example, the example design logic 216 may implement cryptography logic (e.g., a cryptography processor, engine, application, module, or other functional unit related to an encryption/decryption functionality of the computer system 102, etc.) authorized to access secure data from the secure data storage 202 while the SoC device 200 is operating in a secure mode. In this example, the design logic 216 retrieves encrypted data from an external data storage (e.g., the external datastore 122 of FIG. 1), decrypts the encrypted data using an encryption key stored in the secure registers 208, and then stores the decrypted data into the secure RAM 206. In this example, secure data stored in the secure RAM 206 and/or the secure registers 208 passes through one or more electronic components of the design logic 216. Some of these electronic components in the design logic 216 include resettable data storage devices (e.g., flip-flops having a reset input, etc.) that can be cleared by asserting a reset signal for instance. However, in some examples, these electronic components inside the design logic 216 may also include non-resettable components (e.g., flops or latches that do not have a reset input, etc.).

Accordingly, in some examples, as part of the transition process out of the secure mode (and/or other secure data reset process), the example security controller 240 causes the scan chain 212 (and/or 214) to perform a secure scan operation to clear any potential residual portions of the secure data (e.g., stored in non-resettable data storage elements, etc.) inside the logic circuitry 210. For example, the scan chain 212 (and/or 214) may implement a secure scan chain. In some examples, the example security controller 240 causes the scan chain 212 (and/or 214) to perform the secure scan operation by asserting a scan enable input ("Secure_scan_en") of the scan chain(s). For instance, the scan chain 212 (and/or 214) may be configured to serially shift data across the scan chain only when the scan enable input is asserted (e.g., set to a logic '1' state). In some examples, the example security controller 240 generates secure scan data for the scan chain 212 (and/or 214). In some such examples, the secure scan data may be used to flush the storage elements of the scan chains rather than provide a test pattern. For example, the example security controller 240 may signal (e.g., assert or de-assert) a given (e.g., constant) logic state (e.g., logic '0' or logic '1') at the input 212*a* of the scan chain 212 continuously and/or at least until the given logic state (e.g., logic '0') is serially shifted from the input 212*a* to the output 212*b* of the scan chain 212 (e.g., sequentially shifted into a series of flip-flops or other chain of data storage elements). Alternatively, for example, the example security controller may provide a different input signal (e.g., sequence of logic data bits) into the input 212*a* of the scan chain 212 and then wait for the scan chain 212 to serially shift at least one data bit of the input signal from the input 212*a* to the output 212*b*. Additionally or alternatively, in some examples, the example security controller 240 may similarly control the scan chain 214 to serially shift a scan signal (e.g., constant logic state, or the generated input signal, etc.) throughout the scan chain 214.

In some examples, the example security controller 240 causes a plurality of scan chains in the logic circuitry 210 to perform respective scan operations. For example, the security controller 240 may cause all the plurality of scan chains in the logic circuitry 210 to serially shift secure scan data from respective inputs of all the plurality of scan chains to respective outputs of all the plurality of scan chains. Alternatively or additionally, for example, the example security controller 240 may continuously signal to a logic '1' state (or a logic '0' state) the respective inputs of all the plurality of scan chains for at least a threshold time period. The threshold time period may be determined by the example security controller 240 based on a maximum chain length in the plurality of scan chains, as shown in the equation below.

Threshold time period=Max_scan_chain_length*Frequency of clock, Equation (1)

In the example of Equation (1) above, the term "Max_scan_chain_length" corresponds to a maximum number of serially-coupled data storage elements (e.g., flip-flops) in any of the plurality of scan chains in the logic circuitry 210 and the term "Frequency of clock" is a clock frequency at clock inputs of the plurality of scan chains.

Thus, in some examples, the example security controller 240 may flush secure data that may still be in any of the scan chain (e.g., in a non-resettable flip-flop, etc.) and also stimulate design logic circuitry (e.g., design logic 216, 218, etc.) connected to any of the scan chains (e.g., scan chains 212, 214, etc.) that perform the secure scans. In this way, for example, residual portions of secure data in the design logic circuitry and/or the scan chains is "flushed out" (e.g., push out from the design logic to a given scan chain and then serially shifted out of the given scan chain, etc.).

In some examples, as part of the transition out of the secure mode (and/or any other process for protecting the secure data), the example security controller 240 disables an output port (e.g., the output port 222, etc.) of the SoC device 200 during the secure scan operations, during the transition of the SoC device 200 out of the secure mode, and/or until at least one data bit is serially shifted across one or more scan chains (e.g., the scan chains 212, 214, etc.) in the logic circuitry 210. For example, the security controller 240 may prevent (e.g., during the transition out of the secure mode and/or the secure scanning process) any signals serially shifted out of the scan chain 212 (at the output 212*b*), the scan chain 214, and/or any other scan chain (not shown) in the logic circuitry 210 from being transmitted to the test interface 220 (and/or from being transmitted out of the output port 222).

In some examples, one or more of the example scan chains 212, 214, the example design logic 216, 218, the example logic circuitry 210, the example test interface 220, the example mode controller 230, and/or the example security controller 240 may be implemented by a hardware state machine. Alternatively, one or more of the example scan chains 212, 214, the example design logic 216, 218, the example logic circuitry 210, the example test interface 220, the example mode controller 230, and/or the example security controller 240 may be implemented by one or more analog or digital circuit(s), logic circuits, programmable processor(s), programmable controller(s), ASIC(s), PLD(s), and/or FPLD(s).

Figure 3:
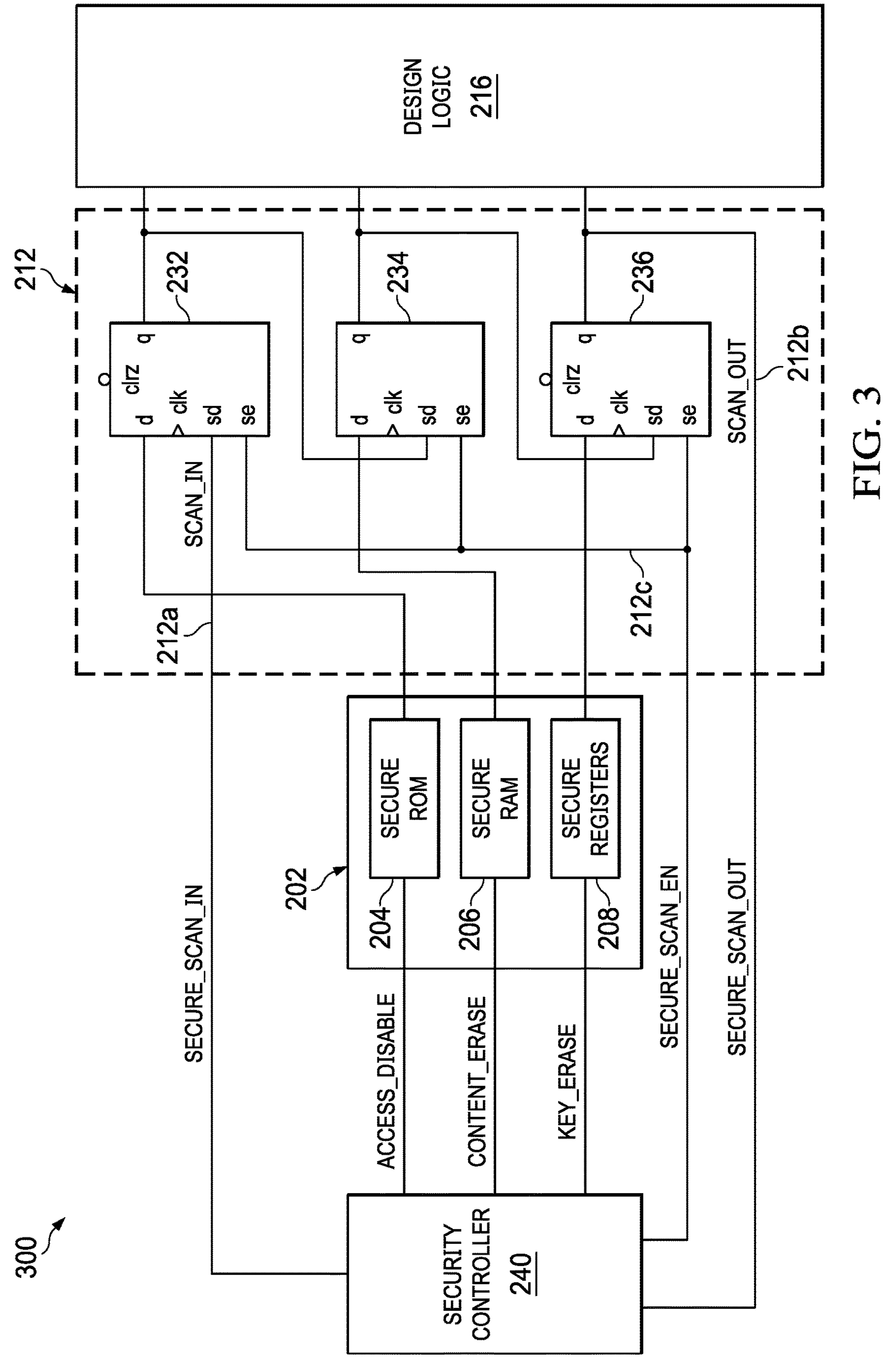
FIG. 3 illustrates an example implementation of the example SoC device of FIG. 2 to protect secure data using a scan operation.

FIG. 3 illustrates an example implementation 300 of the example SoC device of 200 FIG. 2 to protect secure data using a scan operation. In some examples, one or more of the components of the SoC device 200 of FIG. 2 may be alternatively or additionally included in the example SoC device 300 of FIG. 3. In the illustrated example of FIG. 3, the example scan chain 212 includes three data storage elements 232, 234, 236 serially coupled between the example input 212*a* of the scan chain 212 and the example output 212*b* of the example scan chain 212. In this example, the data storage elements 232, 234, 236 are implemented by D flip-flops. Alternatively, one(s) of the data storage elements 232, 234, 236 may be implemented by any other type of flip-flop (e.g., an SR flip-flop, a JK flip-flop, a T flip-flop, etc.) or latch.

By way of example, the security controller 240 asserts (e.g., sets to a logical value '1') an example scan enable input 212*c* (Secure_scan_en') to configure the scan chain 212 for performing the scan operation. The first data storage element 232 then reads at least one data bit at input 212*a* and serially shifts the at least one data bit (e.g., at a next clock edge, etc.) into an input of the example data storage element 234. The data storage element 234 then shifts (e.g., at the next clock cycle edge) the at least one data bit into an input of the example data storage element 236. The data storage element 236 then outputs the at least one data bit out of the scan chain 212 at the output 212*b*. Thus, in the illustrated example of FIG. 3, an input of the data storage element 232 is the input 212*a* of the scan chain 212, and the output of the data storage element 236 is the output 212*b* of the scan chain 212.

The example data storage elements 232, 234, 236 can be flip-flops (e.g., clocked flip-flops, transparent latches, etc.) or any other type of data storage element. In the illustrated example of FIG. 3, the example data storage elements 232 and 236 are resettable flip-flops (e.g., have a reset or 'clrz' input), and the example data storage element 234 is a non-resettable flip-flop. In some examples, the example security controller 240 selects the example scan chain 212 for performing a secure scan operation (e.g., during the transition out of the scan mode) based on a determination that the scan chain 212 including a non-resettable flip-flop (e.g., the second one of the data storage elements 234). Additionally or alternatively, in some examples, the example security controller 240 selects the example scan chain 212 based on the design logic 216 including a non-resettable flip-flop (not shown), based on the scan chain 212 being coupled to the design logic 216, and/or based on a determination the design logic 216 is associated with at least a portion of the secure data in the secure data storage 202 (e.g., the design logic 216 accesses or has accessed the at least portion of the secure data during the secure mode of operation, etc.).

Figure 4:
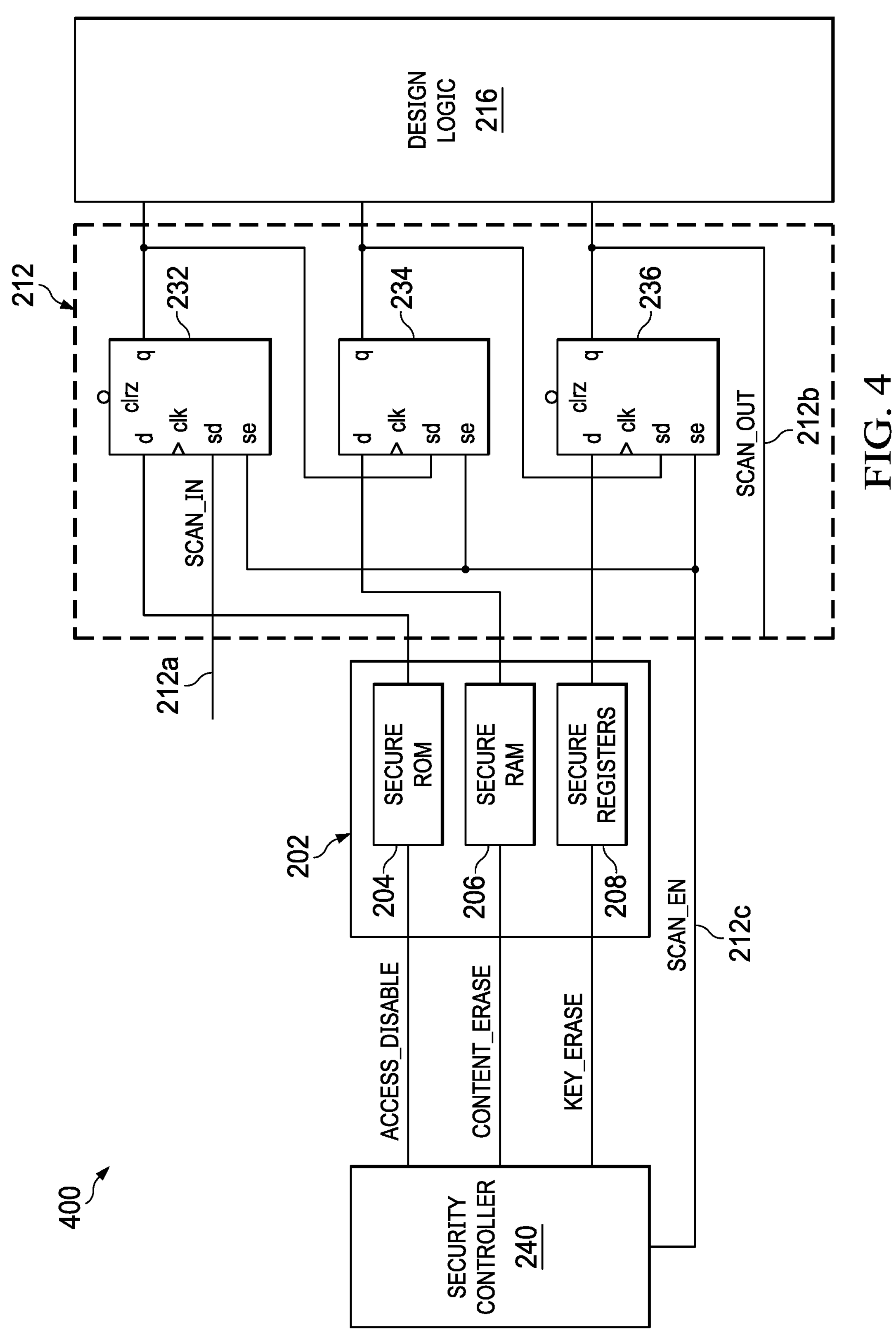
FIG. 4 illustrates an alternative example implementation of the example SoC device of FIG. 2.

FIG. 4 illustrates an alternative example implementation 400 of the example SoC device 200 of FIG. 2. In the illustrated example of FIG. 4, the inputs 212*a*, 212*c* and outputs 212*b* of the example scan chain 212 are not connected to the example security controller 240. For example, the SoC device 400 may represent an alternative example implementation of the SoC device 200 where the security controller 240 does not perform a secure scan operation (e.g., during transition out of a secure mode of operation). For instance, although not shown in FIG. 4, the example inputs 212*a*, 212*c* and outputs 212*b* may be connected (e.g., directly, or via the test interface 220 of FIG. 2) to the example ports 222, 226, etc., of FIG. 2.

In the illustrated example of FIG. 4, when a test scan operation is performed using the alternative implementation 400, a portion of the secure data may be shifted out of the scan chain 212 as part of the output of the design logic 216. In some examples, if the data storage elements 232, 234, 236 are reset before starting a test scan using the scan chain 212, some of the secure data may still reside on residual data registers, data pipelines (e.g., buses, memory cache, etc.), and/or other unsecure circuit components, which may be accessed during a later unsecured operation of the SoC device 200 (e.g., during a test scan, etc.). Advantageously, the security controller 240, the logic circuitry 210, and/or, more generally, the SoC device 200, is/are improvement(s) over the alternative implementation 400 of FIG. 4 because the scan chain 212 of FIGS. 2 and/or 3 may be configured into a secure scan chain by loading constant zeros into the scan chain 212 and/or by blocking the scan outputs of the scan chain 212. Advantageously, the security controller 240, the logic circuitry 210, and/or, more generally, the SoC device 200, may ensure that the secure assets are not compromised via residual registers in the SoC device 200 using scan operation.

While an example manner of implementing the example SoC device 200 is illustrated in FIGS. 2-4, one or more of the elements, processes and/or devices illustrated in FIGS. 2-4 may be combined, divided, re-arranged, omitted, eliminated and/or implemented in any other way. Further, the example secure data storage 202, the example secure ROM 204, the example secure RAM 206, the example secure registers 208, the example logic circuitry 210, the example scan chains 212, 214, the example design logic 216, 218, the example test interface 220, the example mode controller 230, and/or the example security controller 240, and/or, more generally, the example SoC device 200 of FIG. 2 may be implemented by hardware, software, firmware and/or any combination of hardware, software and/or firmware. Thus, for example, any of the example secure data storage 202, the example secure ROM 204, the example secure RAM 206, the example secure registers 208, the example logic circuitry 210, the example scan chains 212, 214, the example design logic 216, 218, the example test interface 220, the example mode controller 230, and/or the example security controller 240, and/or, more generally, the example SoC device 200 could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example secure data storage 202, the example secure ROM 204, the example secure RAM 206, the example secure registers 208, the example logic circuitry 210, the example scan chains 212, 214, the example design logic 216, 218, the example test interface 220, the example mode controller 230, and/or the example security controller 240 is/are hereby expressly defined to include a non-transitory computer readable storage device or storage disk such as a memory, a DVD, a CD, a Blu-ray disk, etc. including the software and/or firmware. Further still, the example SoC device 200 of FIG. 2 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
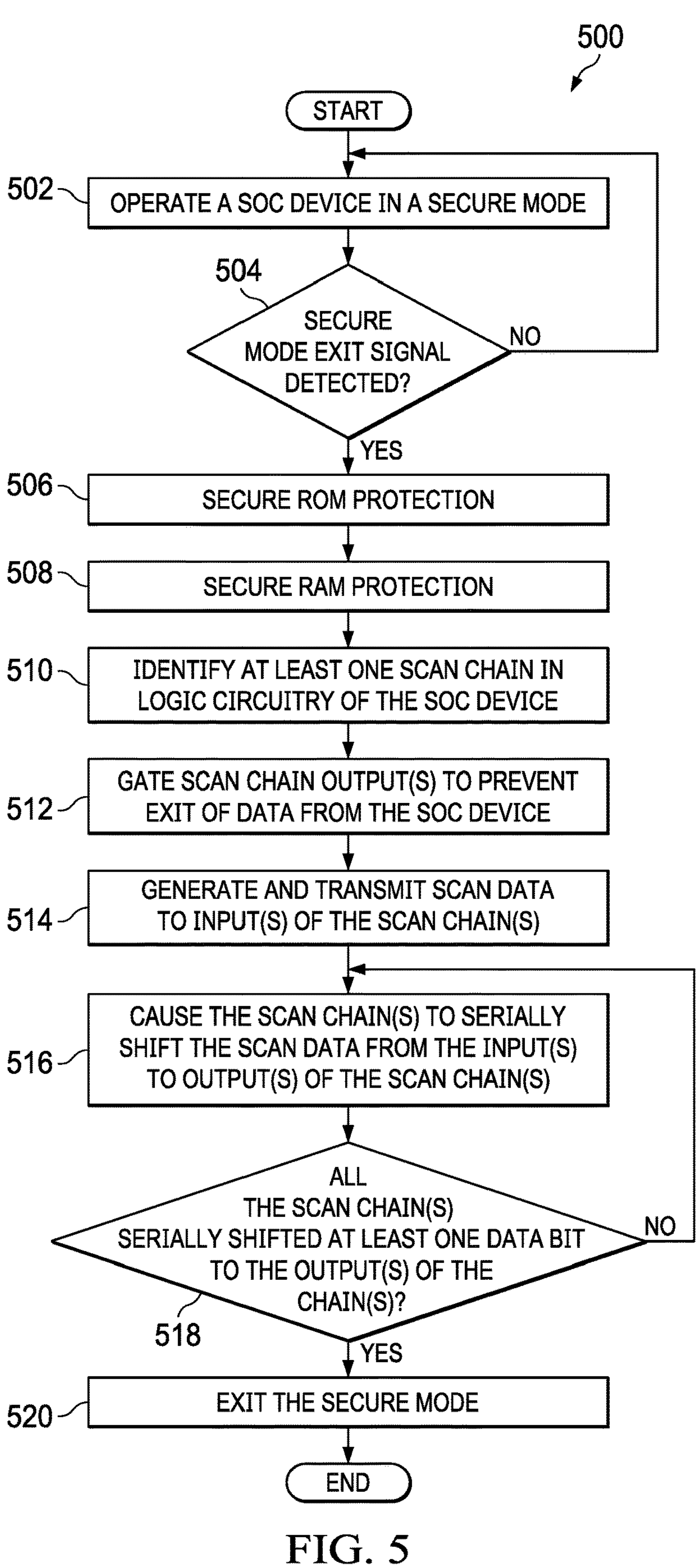
FIG. 5 is a flowchart representative of an example process performed using machine readable instructions that may be executed and/or hardware configured to implement example logic circuitry of FIG. 2 or portion(s) thereof, an example test interface of FIG. 2, an example mode controller of FIG. 2, the example security controller of FIGS. 2, 3, and/or 4, and/or more generally the example SoC devices of FIGS. 2, 3, and/or 4.

A flowchart representative of example processes, hardware logic, machine readable instructions, hardware implemented state machines, and/or any combination thereof for implementing the example logic circuitry 210, the example test interface 220, the example mode controller 230, and/or the example security controller 240 of FIG. 2 is shown in FIG. 5. The processes and/or machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example logic circuitry 210, the example test interface 220, the example mode controller 230, and/or the example security controller 240 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second," etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of an example process 500 performed using machine readable instructions that may be executed and/or hardware configured to implement the example logic circuitry 210 of FIG. 2 or portion(s) thereof, the example test interface 220 of FIG. 2, the example mode controller 230 of FIG. 2, the example security controller 240 of FIGS. 2, 3, and/or 4, and/or more generally the example SoC devices of FIGS. 2, 3, and/or 4.

The process 500 begins at block 502, at which the example security controller 240 operates the example SoC device 200 in a secure mode. For example, the example security controller 240 may enable access to the secure ROM 204 (e.g., for one or more trusted components of the logic circuitry 210, etc.), stores (and/or allows storing) secure data (e.g., secure program instructions, secure encryption keys, and/or other secure data) into the secure RAM 206 and/or the secure registers 208.

At block 504, the security controller 240 determines if a secure mode exit signal is detected (e.g., from the mode controller 230, etc.). If the secure mode exit signal is detected, the security controller 240 transitions the SoC device 200 out of the secure mode (i.e., the process 500 proceeds to block 506). Otherwise, the security controller 240 keeps the SoC device 200 operating in the secure mode (i.e., the process 500 returns to block 502).

As part of the transition out of the secure mode, the security controller 240 secures protection of the secure ROM 204 (at block 506), secures protection of the secure RAM 206 and/or the secure registers 208 (at block 508), and operates one or more scan chains in the logic circuitry 210 to perform scan operations, as described in more detail below in connection with blocks 510-520 of the process 500.

At block 510, the security controller 240 identifies at least one scan chain in the logic circuitry 210. In some examples, the identification at block 510 includes the security controller 240 identifying all the scan chains in the logic circuitry 210. Alternatively, in some examples, the identification at block 510 includes the security controller 240 identifying a scan chain based on the scan chain including at least one non-resettable flip-flop (e.g., data storage element 234 of FIGS. 3 and/or 4). Alternatively or additionally, in some examples, the identification at block 510 includes the security controller 240 identifying a scan chain based on the scan chain being coupled (and/or connected) to design logic that includes at least one non-resettable flip-flop (or other type of non-resettable data storage element).

At block 512, the security controller 240 gates scan chain output(s) to prevent an exit of data from the SoC device (e.g., the SoC device 200). For example, the security controller 240 may gate the outputs of one(s) of the data storage elements 232, 234, 236 of FIG. 2 to prevent an exit of data (or portion thereof) from exiting the scan chain 212, the logic circuitry 210, and/or, more generally, the SoC device 200.

At block 514, the security controller 240 generates and transmits scan data (e.g., at least one data bit) into the input 212*a* of the identified scan chain 212 (and/or into an input of scan chain 214, etc.). In some examples, the security controller generates the scan data at block 512 by asserting a constant logic value (e.g., logic '0' or logic '1') at the input(s) (e.g., input 212*a*, etc.) of the scan chain(s) (e.g., scan chain 212, etc.) identified at block 510.

At block 516, the security controller 240 causes the scan chain 212 (and/or any other scan chain identified at block 510) to serially shift the scan data generated at block 514 through all the data storage elements (e.g., the data storage elements 232, 234, 236, etc.) in the scan chain (e.g., the scan chain 212, etc.) from the input (e.g., the input 212*a*, etc.) of the scan chain (e.g., the scan chain 212, etc.) to the output (e.g., the output 212*b*, etc.) of the scan chain. For example, the security controller 240 may continue asserting (e.g., set to a logic value '1') scan enable input(s) (e.g., the enable input 212*c* of FIGS. 3-4) while a scan clock causes the scan chain(s) to perform the serial shifting at least until all the scan chain(s) have completed serially shifting at least one data bit from the input(s) of the scan chain(s) to the output(s) of the scan chain(s).

At block 518, the security controller 240 determines whether all the scan chain(s) identified at block 510 have completed scanning the input scan data (e.g., whether all the scan chain(s) have completed serially shifting at least one data bit from the input(s) to the output(s) of all the scan chain(s)). If all the scan chains have been completely scanned (e.g., at least one data bit serially shifted throughout all the scan chains, etc.), then the process 500 proceeds to block 520. Otherwise, the process 500 returns to block 516 (e.g., the security controller 240 waits until all the scan chains complete serially shifting the input scan data into all the flip-flops (and/or other data storage elements) therein before exiting the secure mode) to continue to cause the scan chain(s) to serially shift the scan data from the input(s) to the output(s) of the scan chain(s).

At block 520, the security controller 540 exits the secure mode (e.g., completes the transition of the SoC device 200 out of the secure mode) and the process 500 concludes.

Figure 6:
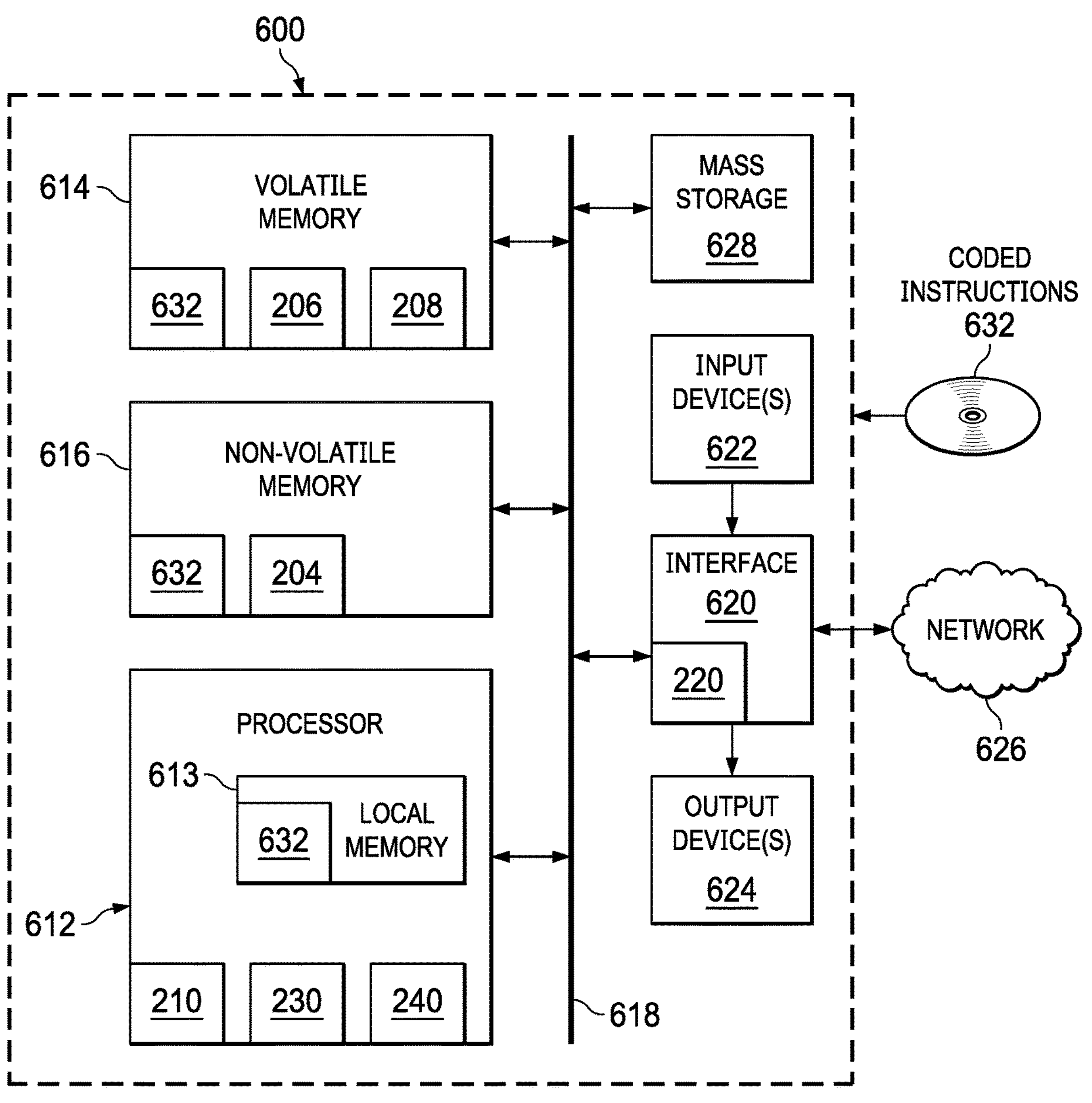
FIG. 6 is a block diagram of an example processing platform structured to execute the example process of FIG. 5 to implement the example logic circuitry of FIG. 2 or portion(s) thereof, the example test interface of FIG. 2, the example mode controller of FIG. 2, the example security controller of FIGS. 2, 3, and/or 4, and/or more generally the example SoC devices of FIGS. 2, 3, and/or 4.

FIG. 6 is a block diagram of an example processor platform 600 structured to execute the instructions of FIG. 5 to implement the example secure data storage 202, the example logic circuitry 210, the example test interface 220, the example mode controller 230, and/or, more generally, the example SoC devices 200, 300, and/or 400 of FIGS. 2-4. The processor platform 600 can be, for example, an electronic control unit of a vehicle, a server, a personal computer, a workstation, a self-learning machine (e.g., a neural network), a gaming console, or any other type of computing device.

The processor platform 600 of the illustrated example includes one or more processors 612. The processors 612 of the illustrated example are hardware. For example, the processors 612 can be implemented by one or more integrated circuits (ICs), logic circuits, microprocessors, GPUs, DSPs, or controllers from any desired family or manufacturer. The hardware processors may be a semiconductor based (e.g., silicon based) device.

The processors 612 of the illustrated example include a local memory 613 (e.g., a cache, a volatile memory, a non-volatile memory, etc.). The processors 612 of the illustrated example are in communication with a main memory including a volatile memory 614 and a non-volatile memory 616 via a bus 618. The volatile memory 614 may be implemented by one or more flip-flops, Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller. In the illustrated example, the processors 612 implement the example logic circuitry 210, the example mode controller 230, and the example security controller 240. In alternative examples, the example logic circuitry 210, the example mode controller 230, and/or the example security controller 240 are instead implemented outside the processors 612 (e.g., by one or more ICs (not shown) coupled to the example bus 618, etc.).

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface. In the illustrated example, the interface circuit 620 implements the example test interface 220 of FIG. 2. In the alternative examples, the example test interface 220 is instead implemented by a different component coupled to the bus 618 (e.g., the processor 612, one or more ICs (not shown), etc.).

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

In the illustrated example, the example volatile memory 614 implements the example secure RAM 206 and the example secure registers 208. Further, in this example, the example non-volatile memory 616 implements the example secure ROM. In alternative examples, the example secure ROM 204, the example secure RAM 206, and/or the example secure registers 208 is/are instead implemented by the local memory 613, the logic circuitry 210, and/or one or more other components (not shown) coupled to the bus 618.

From the foregoing, it will be appreciated that example methods, apparatus, and articles of manufacture have been disclosed that protect secure assets in a computing system from unauthorized access. The disclosed methods, apparatus, and articles of manufacture described herein improve the efficiency of using a computing device by using test scan logic (e.g., test scan chains) coupled to various circuitry logic inside the computing device to clear residual portions of secure data that might still be stored within data registers, non-resettable data storage elements (e.g., non-resettable flip-flops), data pipelines, and/or other design logic, as well as disabling and/or erasing other secure data in various memories (e.g., secure ROM, secure RAM. The disclosed methods, apparatus, and articles of manufacture are accordingly directed to one or more improvement(s) in the functioning of a computer by reducing the likelihood that secure information in the computer is compromised and/or manipulated by a malicious entity.

Example methods, apparatus, systems, and articles of manufacture to protect secure assets are described herein. Further examples and combinations thereof include the following:

Example 1 includes an apparatus comprising logic circuitry including a scan chain that includes data storage elements and design logic coupled to the scan chain, data storage to store secure data, wherein the design logic is coupled to the data storage, and a security controller to transition the apparatus out of a secure mode of operation, wherein the transition includes the security controller to cause the scan chain to serially shift secure scan data from an input of the scan chain into each data storage element of the data storage elements of the scan chain.

Example 2 includes the apparatus of example 1, further comprising an output port, wherein the security controller is to prevent the output port from outputting an indication of the output of the scan chain during the transition.

Example 3 includes the apparatus of example 1, wherein the security controller is to generate the secure scan data, and transmit the secure scan data into the input of the scan chain.

Example 4 includes the apparatus of example 3, wherein the security controller is to generate a signal indicative of a constant logic state at the input of the scan chain at least until the constant logic state is serially shifted from the input of the scan chain into the each data storage element of the data storage elements of the scan chain.

Example 5 includes the apparatus of example 3, wherein the scan chain is a first scan chain and the logic circuitry includes a plurality of scan chains including the first scan chain, and wherein the security controller is to continuously generate a signal indicative of a given logic state at respective inputs of all the plurality of scan chains at least until the given logic state is serially shifted to respective outputs of all the plurality of scan chains.

Example 6 includes the apparatus of example 1, wherein the security controller is to enable access, by the design logic, to at least a portion of the secure scan data based on the apparatus operating in the secure mode of operation, and wherein the security controller is to disable access, by the design logic, to the secure scan data.

Example 7 includes the apparatus of example 1, wherein the scan chain is a first scan chain and the logic circuitry includes a plurality of scan chains including the first scan chain, and wherein the security controller is to select the first scan chain from the plurality of scan chains.

Example 8 includes the apparatus of example 7, wherein the security controller is to select the first scan chain based on the first scan chain being coupled to the design logic and the design logic being associated with at least a portion of the secure scan data.

Example 9 includes the apparatus of example 7, wherein the security controller is to select the first scan chain based on a determination that the scan chain includes at least one non-resettable flip-flop.

Example 10 includes the apparatus of example 7, wherein the security controller is to select the first scan chain based on a determination that the design logic includes at least one non-resettable flip-flop.

Example 11 includes the apparatus of example 1, wherein the apparatus is a system-on-a-chip (SoC) device.

Example 12 includes the apparatus of example 1, wherein the scan chain includes a plurality of flip-flops.

Example 13 includes the apparatus of example 1, wherein the logic circuitry is integrated on an integrated circuit substrate.

Example 14 includes the apparatus of example 13, wherein the security controller is also integrated on the integrated circuit substrate.

Example 15 includes the apparatus of example 1, wherein the data storage includes one or more of at least one of a secure read only memory, a secure random access memory, or a secure data register.

Example 16 includes an integrated circuit comprising data storage to store secure data, design logic coupled to the data storage, a plurality of scan chains including at least a scan chain coupled to the design logic, the scan chain including data storage elements, and a security controller to transition the integrated circuit out of a secure mode of operation, wherein the transition includes the security controller to cause the scan chain to serially shift secure scan data from an input of the scan chain into ones of the data storage elements of the scan chain.

Example 17 includes the integrated circuit of example 16, further comprising an output port, wherein the security controller is to prevent the output port from outputting an indication of the output of the scan chain during the transition.

Example 18 includes the integrated circuit of example 16, wherein the security controller is to generate the secure scan data and transmit the secure scan data.

Example 19 includes the integrated circuit of example 18, wherein the security controller is to generate a signal indicative of a constant logic state at the input of the scan chain.

Example 20 includes a method comprising identifying, by a processor of a system-on-a-chip (SoC) device, design logic in the SoC device based on the design logic being associated with secure data storage in the SoC device, identifying a scan chain in the SoC device based on the scan chain being coupled to the design logic, the scan chain including data storage elements, and transitioning the SoC device out of a secure mode of operation, wherein the transitioning includes causing the scan chain to serially shift secure scan data from an input of the scan chain into ones of the data storage elements of the scan chain.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system, comprising:

data storage configured to store secure data;

logic circuitry including:

design logic configured to access the secure data stored in the data storage during a secure mode; and a plurality of scan chains coupled to the design logic, each of the plurality of scan chains including a plurality of data storage elements coupled in series; and a security controller configured to:

cause the design logic to transition out of the secure mode, wherein to transition out of the secure mode, the security controller is configured to:

select a subset of scan chains out of the plurality of scan chains based on a determination that the subset of scan chains includes at least one non-resettable flip-flop; and cause the plurality of data storage elements of the selected subset of scan chains, not a remainder of the plurality of scan chains, to serially shift scan data that is separate from the secure data through the plurality of data storage elements.

2. The system of claim 1, wherein the scan data includes data of a predetermined value.

3. The system of claim 2, wherein the predetermined value is binary 0.

4. The system of claim 1, wherein the security controller is configured to provide the scan data to the selected subset of scan chains at least until a portion of the scan data is detected at an output of the selected subset of scan chains.

5. The system of claim 1, wherein:

the selected subset of scan chains includes one or more scan chains; and the security controller is configured to cause the plurality of data storage elements of each of the selected subset of scan chains to serially shift the scan data through the plurality of data storage element of a scan chain.

6. The system of claim 1, wherein to the transition out of the secure mode, the security controller is configured to disable the access, by the design logic, to the secure data.

7. The system of claim 1, wherein the security controller is configured to provide the scan data to the selected subset of scan chains for at least a threshold time period.

8. The system of claim 1, wherein the security controller is configured to select the selected subset of scan chains based on the design logic being associated with at least a portion of the secure data.

9. The system of claim 1, wherein the security controller is configured to select the selected subset of scan chains based on a determination that the design logic includes at least one non-resettable flip-flop.

10. The system of claim 1, wherein the system is a system-on-a-chip (SoC).

11. The system of claim 1, wherein the plurality of data storage elements of the selected subset of scan chains includes a plurality of flip-flops.

12. The system of claim 11, wherein the plurality of flip-flops includes a plurality of D flip-flops.

13. The system of claim 1, wherein to the transition out of the secure mode, the security controller is configured to gate an output of the system to prevent the secure data shifted out of the plurality of data storage elements of the selected subset of scan chains from exiting the system.

14. The system of claim 1, wherein the data storage includes at least one of a read only memory, a random access memory, or a register.

15. A system, comprising:

design logic configured to access secure data during a secure mode;

a plurality of scan chains coupled to the design logic, each of the plurality of scan chains including a plurality of data storage elements coupled in series; and a security controller configured to:

transition the design logic out of the secure mode, wherein to transition out of the secure mode, the security controller is configured to:

select a subset of scan chains out of the plurality of scan chains based on a determination that the subset of scan chains includes at least one non-resettable flip-flop; and provide scan data of a predetermined value to serially shift through the plurality of data storage elements of the selected subset of scan chains, not a remainder of the plurality of scan chains.

16. The system of claim 15, wherein the plurality of data storage elements of the selected subset of scan chains includes a plurality of flip-flops.

17. The system of claim 15, wherein the predetermined value is binary 0.

18. A method, comprising:

transitioning, by a security controller, a design logic of an integrated circuit into a secure mode to access secure data stored in the integrated circuit, wherein the design logic is coupled to a plurality of scan chains, wherein each of the plurality of scan chains includes a set of data storage elements coupled in series, and wherein one of the design logic or the set of data storage elements includes a non-resettable data storage element; and transitioning, by the security controller, the design logic out of the secure mode, which includes:

selecting a subset of scan chains out of the plurality of scan chains based on a determination that the subset of scan chains includes at least one non-resettable flip-flop;

disabling the access of the design logic to the secure data; and providing data of a predetermined value to serially shift through the set of data storage elements of the selected subset of scan chains, not a remainder of the plurality of scan chains.

19. The system of claim 15, wherein:

the selected subset of scan chains includes one or more scan chains; and the security controller is configured to cause the plurality of data storage elements of each of the selected subset of scan chains to serially shift the scan data through the plurality of data storage element of a scan chain.

20. The system of claim 15, wherein the security controller is configured to provide the scan data to the selected subset of scan chains for at least a threshold time period.

* * * * *